June 7, 1966  J. D. GOESCHL  3,254,479
STACKED PLATE CHROMATOGRAPHIC COLUMN
Filed July 2, 1962  4 Sheets-Sheet 1

INVENTOR:
JOHN D. GOESCHL
BY
ATTORNEYS

June 7, 1966   J. D. GOESCHL   3,254,479
STACKED PLATE CHROMATOGRAPHIC COLUMN
Filed July 2, 1962   4 Sheets-Sheet 2

INVENTOR:
JOHN D. GOESCHL
BY
ATTORNEYS

June 7, 1966  J. D. GOESCHL  3,254,479
STACKED PLATE CHROMATOGRAPHIC COLUMN
Filed July 2, 1962  4 Sheets-Sheet 3

INVENTOR:
JOHN D. GOESCHL
BY
ATTORNEYS

June 7, 1966  J. D. GOESCHL  3,254,479
STACKED PLATE CHROMATOGRAPHIC COLUMN
Filed July 2, 1962  4 Sheets-Sheet 4
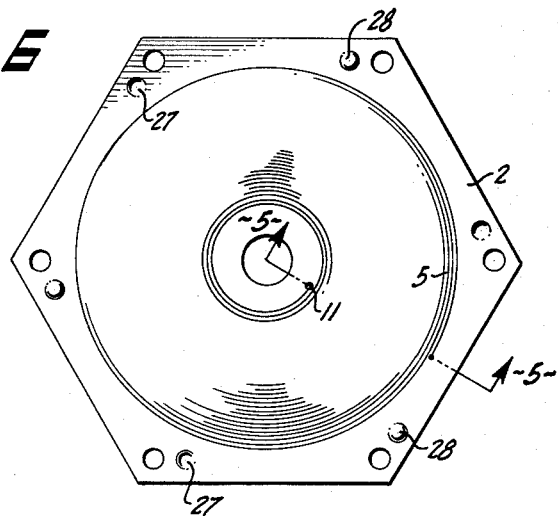
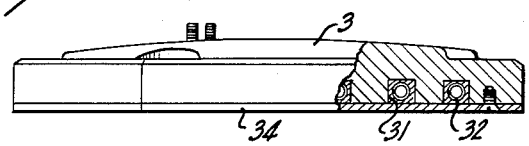
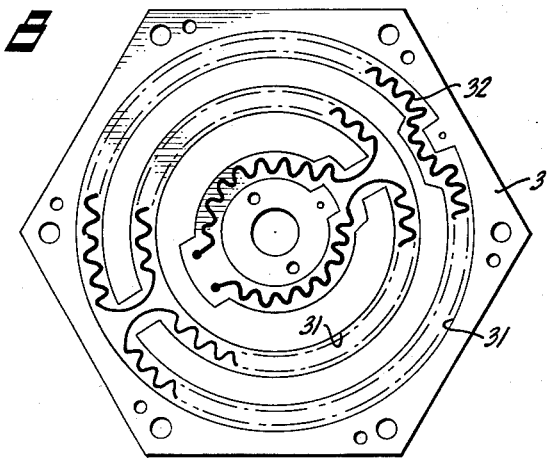
INVENTOR:
JOHN D. GOESCHL
BY
ATTORNEYS Patented June 7, 1966

3,254,479
STACKED PLATE CHROMATOGRAPHIC COLUMN
John D. Goeschl, Davis, Calif., assignor to The Regents of The University of California, Berkeley, Calif.
Filed July 2, 1962, Ser. No. 206,947
2 Claims. (Cl. 55—386)

This invention relates to and in general has for its object the provision of a chromatographic column.

Chromatography is the technique by which different materials can be spacially separated on an adsorbent. Gas-liquid chromatography utilizes the differential solubility or adsorptivity of the components of a chemical mixture in or on the surface of another chemical. Instrumentally, the sample to be tested is vaporized by heat if it is not already a vapor, and then swept by an inert gas, usually helium or nitrogen, through a column. The column contains another chemical, the stationary phase, deposited on the inner surface of the column itself, or on a material with which the column is packed. The components of the sample travel through the column at varying rates, depending on their affinities for the stationary liquid phase in the column, emerge separately from the column, in order of increasing affinity, and are measured by special detectors. Detector output signals are recorded as peaks on a strip chart recorder.

The common capillary columns currently in use are many times better in separating efficiency than the classical packed gas-liquid chromatographic column. Capillary performance is characterized by high resolution, high speed of analysis, and wide dynamic range. Small sample concentrations in the column and lower capacity ratios permit operation at lower temperate (a useful feature when high boilers are analyzed) and component elution times are short, thereby cutting total analysis time. The capillary column itself is generally a compact spiral wound capillary tube with an inside diameter of about 0.010 inch. The length varies from 100 to 350 feet (in common use). Capillary columns not only differ in diameter from the ¼-inch packed type chromatographic column, but also in the manner of deposition of the stationary liquid phase. In a packed column, the liquid phase is coated on the surfaces of the granules of an inert support such as diatomaceous earth, usually in a ratio of 15 to 20% by weight. The column is then filled with this coated material. In the case of capillary columns, the stationary liquid phase is deposited as a thin film on the inside wall of the capillary tube, eliminating band spreading due to packing inhomogeneities. No solid support material is used with these columns.

With columns of such small diameter, frequent stoppages are encountered.

More specifically, one of the objects of this invention is the provision of a so-called chromatographic column consisting essentially in a stack of plates, each provided on one face thereof with a helical groove and wherein the contiguous ends of the grooves of adjacent plates are connected so as to form a continuous channel extending through the entire stack of plates.

Still another object of this invention is the provision of a chromatographic column of the character above described wherein said stack of helically grooved plates are clamped between top and bottom backing plates, and wherein heating elements are incorporated in said latter plates.

A further object of this invention is the provision, in a chromatographic column of the character above described, of means for indexing the helically grooved plates relative to each other so that the end of the groove in one plate will lie in a position contiguous to the end of the corresponding groove in the next succeeding adjacent plate.

Another object of this invention is the provision, in a chromatographic column of the character above described, of a two-way valve mounted on one of its backing plates for selectively establishing communication with either the outer end or the inner end of the helical groove formed in any of said plates.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in other forms.

Referring to the drawings:

FIG. 6 is a top plan of the bottom grooved plate of the column.

FIG. 7 is a side elevation partly in section of the top backing plate, and

FIG. 8 is a bottom plan of the top backing plate with its cover plate removed so as to expose the heating element associated therewith.

Figure 4:
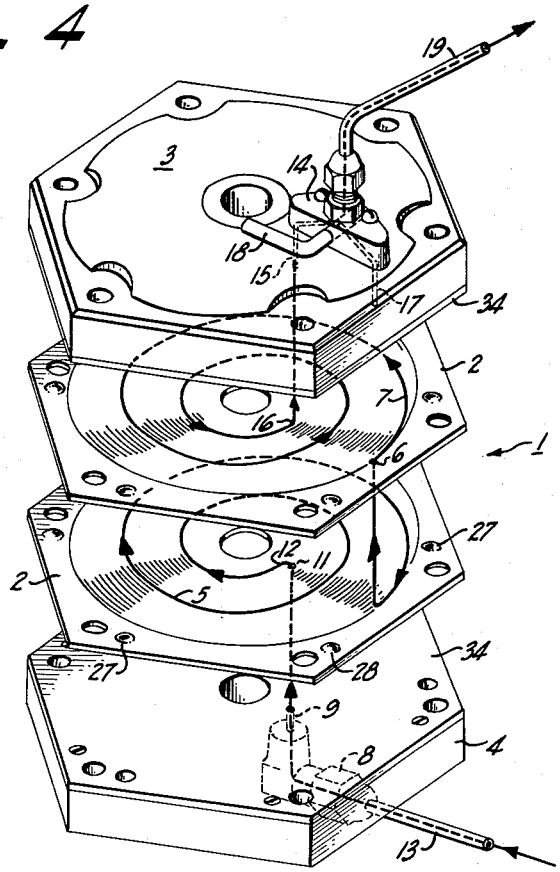
FIG. 4 is an exploded view similar to that shown in FIG. 3 but with the elements thereof spaced farther apart so as to make the helical grooves more readily apparent, and to enable the bottom fitting to be shown.
Figure 5:
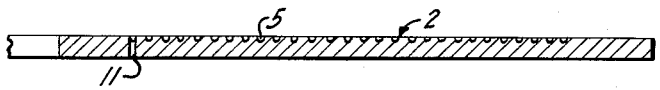
FIG. 5 is an enlarged fragmentary section of one of the helically grooved plates.

As best illustrated in FIG. 4, the chromatographic column illustrated in the drawings consists essentially in a stack 1 of any desired number of axially aligned plates 2 held under pressure in gas-tight sealing engagement with each other between a top backing plate 3 and a bottom backing plate 4.

Formed in the lowermost plate 2 is a helical groove or channel 5 communicating at its outer end through a hole 6 with the outer end of a similar helical groove or channel 7 formed in the next succeeding plate 2. Although in the embodiment of the invention illustrated in FIG. 4 only two grooved plates have been utilized, any number of plates can be used, depending upon the length of the column desired. In each case the corresponding ends (either the outer ends or the inner ends) of the helical grooves of two adjacent plates are made to communicate with each other and then the other ends of the grooves of the next two plates are made to communicate with each other so that all fluid passing through the interconnected grooves passes alternately from the inner end of one groove to its outer end and then from the outer end of the next succeeding groove to the inner end thereof, and so on through the entire stack of plates. These grooves should, of course, be of capillary dimensions, their actual size depending upon whether a liquid or a gas is to be analyzed by passing it through the column.

Mounted on the outer face of the bottom backing plate 4 is an elbow 8 provided with a discharge conduit 9 arranged to pass through the end plate and communicate with a hole 11 formed in the lowermost grooved plate 2 in communication with the inner end 12 of the helical groove hole 11. The conduit 9 communicates through a passageway formed in the fitting 8 with a conduit 13 arranged to receive the fluid to be analyzed by the column.

Mounted on the upper face of the top end plate 3 is a two-way valve 14, said valve communicating with a groove terminus 16 of groove 7 by a conduit 15 formed through the end plate. Also provided in the valve 14 is an alternative conduit 17 arranged to communicate at its lower end with the outer end of the groove 5. Included in the valve 14 is an operating handle 18 by which either of the conduits 15 or 17 can be selectively placed in communication with a discharge conduit 19. If in the assembly illustrated in FIG. 4, an additional uppermost grooved plate 2 had been used, the inner end of its helical groove 5 would communicate with the inner end of the immediately underlying helical groove, and its outer end would then communicate with the lower end of the conduit 17. Under these conditions the position of the valve 14 is reversed so as to close the passageway through the conduit 15 and establish communication between the conduit 17 and the conduit 19.

Figure 1:
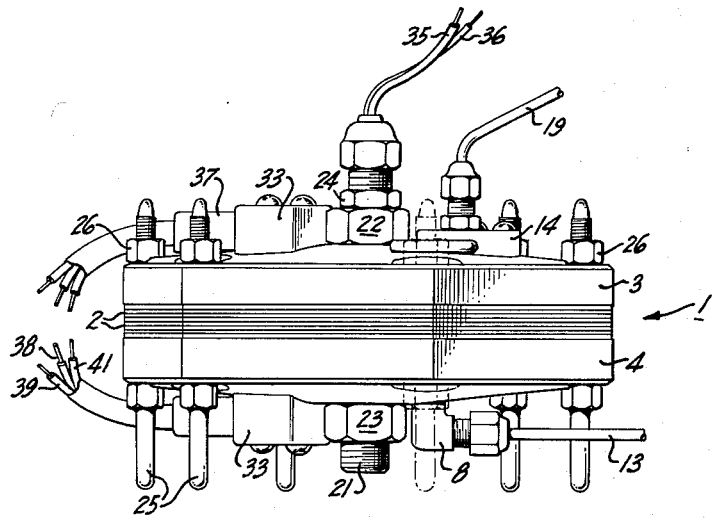
FIG. 1 is a side elevation of a chromatographic column embodying the objects of my invention.
Figure 2:
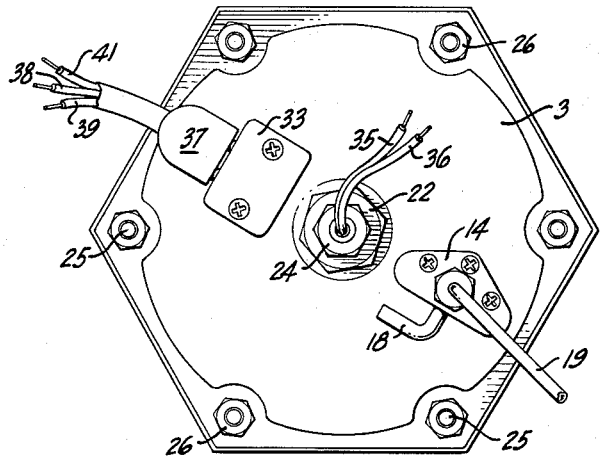
FIG. 2 is a top plan of the chromatographic column illustrated in FIG. 1.
Figure 3:
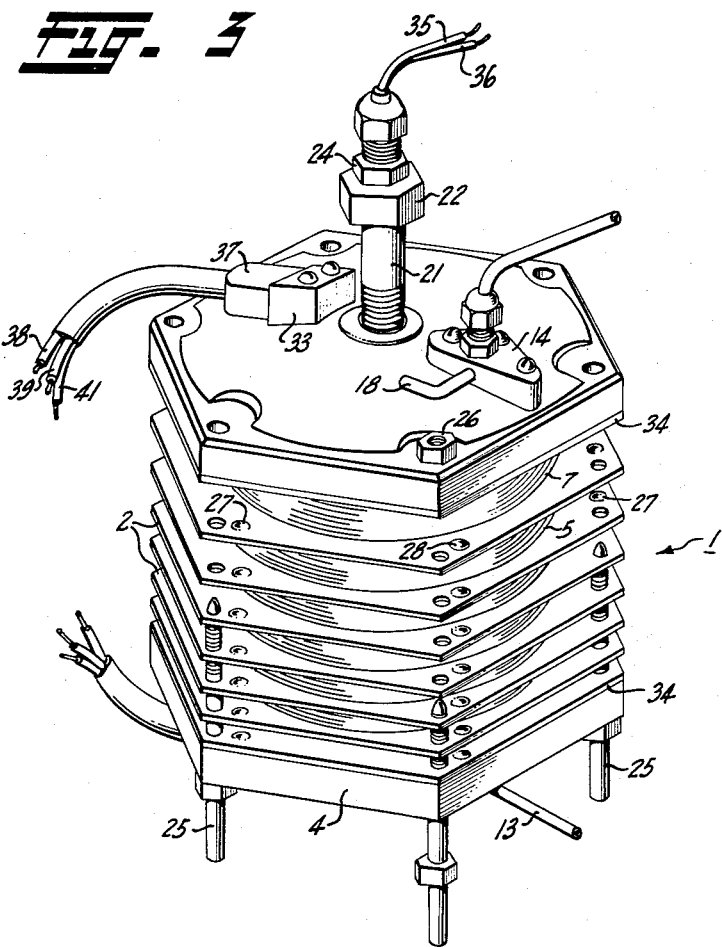
FIG. 3 is an exploded view of the chromatographic column illustrated in FIGS. 1 and 2.

The stack 1 of grooved plates 2 and their bottom backing plates are provided with coaxial bores and strung on a threaded pipe or tube 21 (FIG. 1). Threaded over each end of the pipe 21 are nuts 22 and 23, and threaded over the upper end of the pipe 21 above the nut 22 is a lock nut 24. To insure that the stack 1 of plates are maintained in gas-tight sealing engagement with each other so as to make closed channels of the helical grooves, bolts 25 are passed through the edges of the grooved plates and through the backing plates and tightly secured by nuts 26 threaded thereon. Although as illustrated all of the plates are of hexagonal configuration, this configuration is, of course, optional. The backing plates 3 and 4, however, should have sufficient thickness to result in a rigid structure.

To more readily stack the grooved plates 2 in proper angular alignment with each other and more particularly so that the ends of the plate grooves and their associated holes (holes 11 and 16, for example) the plates are provided with alternate dimples 27 and complementary raised buttons 28 so formed that the raised buttons of one plate will be snugly accommodated in the overlying dimples of an adjacent plate.

For the purpose of maintaining the column at any desired predetermined temperature, the inner face of each of the backing plates 3 and 4 is provided with annular grooves 31 for the reception of a heating element 32. Mounted on the outer face of each backing plate 3 and 4 is a male connector 33 to which the terminals of the heating element 32 are connected. Covering and screwed over the inner face of each backing plate 3 and 4 is a cover plate 34.

Suspended within the central pipe 21, but not shown, is a thermocouple junction the terminals of which are connected with a pair of leads 35 and 36 and which in turn can be connected to a temperature-recording device. The connector 33 is, of course, arranged to be coupled to a female connector or plug 37 in circuit through leads 38 and 39 with a source of electric current and also with a ground lead 41.

To insure gas-tight fits between the contacting surfaces of all of the plates, they should preferably be machined or processed, and preferably they should be made of stainless steel.

The column above described constitutes an improvement over the column described in the pending application Serial No. 146,867 of Wilson et al., filed October 23, 1961, for several reasons. In the first place, it is much easier to maintain two flat plates in gas-tight contact with each other than it is to maintain two coaxial cylinders in such contact. Cleaning the grooves in a flat plate can be more easily accomplished than cleaning grooves formed on a cylinder, and the length of the column formed by a stack of plates can be varied merely by varying the number of plates in the stack without the necessity of resorting to the valve mechanism disclosed in the pending application above referred to. Also, it is easier to prepare a column of the stacked plate variety than to prepare the cylinder type of column.

In liquid chromatography the unit is used as follows: With the column open, an active stationary phase is prepared in a solution or suspension and deposited by flowing, spraying, painting, etc., into the groove of the column. A silica gel column, for instance, can be prepared in much the same manner as that used for thin layer chromatography. The silica gel (powdered silicic acid) is mixed with starch in water and cooked until a gelatinous suspension is obtained. This is then poured onto the grooved surface and the excess cleaned away, leaving the groove full or partly full of the material. Upon drying, this suspension is left deposited on the walls of the groove. The column is then closed and used with the appropriate liquid eluting solvents.

The use of this column for gas chromatography is conventional and should require no further explanation.

I claim:

1. A chromatographic column comprising: a stack of plates, each provided on one side thereof with a helical groove, one end of the groove on each plate being in vertical registration and in communication with the corresponding end of the groove in one of the next adjacent plates so as to form a continuous chromatographic channel; end plates disposed over the terminal plates of said stack of plates, means for clamping all of said plates tightly together so as to maintain the contacting surfaces thereof in gas-tight engagement with each other; a conduit provided on one of said end plates communicating with one end of said channel; a two-way valve provided on the other of said end plates and means for selectively establishing communication between one side of said valve and the outer and inner ends of said groove in said grooved plate immediately underlying said other end plate.

2. A chromatographic column comprising: a stack of plates strung on a central tube and provided on corresponding faces with a helical groove communicating with the corresponding end of the groove in one of the immediately adjacent grooves thereby to form a continuous chromatographic column; backing plates strung on said tube over the ends of said stack of plates; nuts threaded on the ends of said tube for clamping the contacting surfaces of said plates into gas-tight engagement with each other; means for introducing fluid into one end of said channel; means for discharging fluid from the other end of said channel; a heater embedded within each of said backing plates and a thermocouple junction mounted within said central tube.

References Cited by the Examiner

UNITED STATES PATENTS

| | | |
|---|---|---|
| 2,981,092 | 4/1961 | Marks. |
| 3,062,037 | 11/1962 | Donner et al. |
| 3,149,941 | 9/1964 | Barnitz et al. _____ 73—23.1 |

OTHER REFERENCES

German printed application No. 1,113,319, August 1961.

REUBEN FRIEDMAN, *Primary Examiners.*

HARRY B. THORNTON, *Examiner.*

L. H. McCARTER, *Assistant Examiner.*